Figure 1:
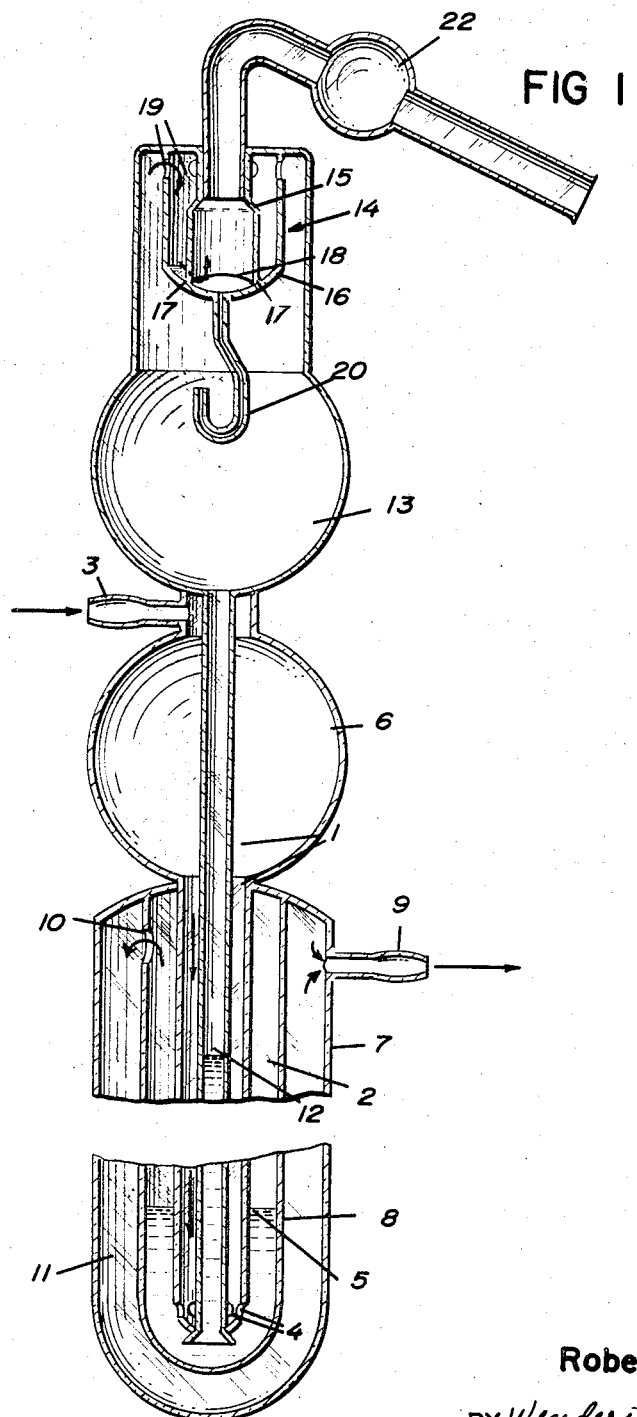

Oct. 24, 1967 — R. TREFZER — 3,348,827
GAS WASHING BOTTLE
Filed Sept. 13, 1965 — 2 Sheets-Sheet 1

INVENTOR
Robert Trefzer
ATTORNEYS

Oct. 24, 1967   R. TREFZER   3,348,827
GAS WASHING BOTTLE
Filed Sept. 13, 1965   2 Sheets-Sheet 2
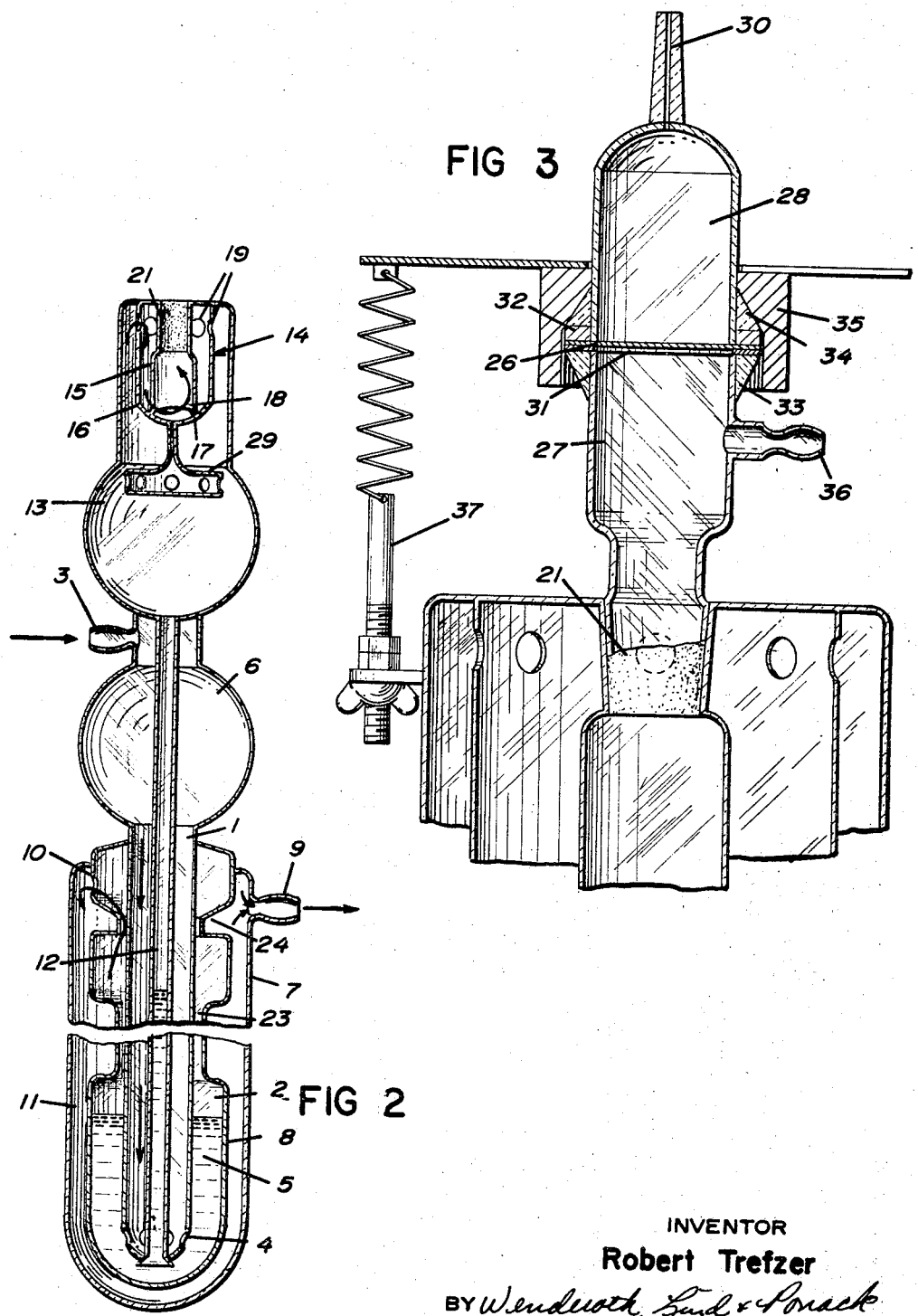
INVENTOR
Robert Trefzer
BY Wendroth, Lind & Ponack
ATTORNEYS

United States Patent Office 3,348,827
Patented Oct. 24, 1967

3,348,827
GAS WASHING BOTTLE
Robert Trefzer, Basel, Switzerland, assignor to Ciba Limited, Basel, Switzerland, a company of Switzerland
Filed Sept. 13, 1965, Ser. No. 486,854
Claims priority, application Switzerland, Sept. 18, 1964, 12,181/64; July 27, 1965, 10,502/65
10 Claims. (Cl. 261—121)

This invention relates to an improved gas washing bottle.

Essentially a gas washing bottle is a device for passing a gas which is required to be treated through a treating liquid, known as the washing liquid. Usually gas washing bottles are employed for removing impurities from a gas i.e. for "washing" the gas, but they may be used for other purposes in which a gas is required to be passed through a treating liquid. It is an important requirement of gas washing bottles, particularly when corrosive washing liquids such as concentrated sulphuric acid are employed, that the washing liquid should not pass into either the gas feed line or the gas extraction duct should there be a sudden increase or decrease in the normal pressure at which the gas to be treated is supplied. To ensure this, separate inlet and outlet vessels are sometimes provided but this expedient increases the complexity of construction and operation of the apparatus.

The object of the present invention is to provide an improved gas washing bottle which in one unit fulfills the same function as the gas washing bottle sets which include separate inlet and outlet vessels.

In accordance with the invention there is provided a gas washing bottle comprising an inner vessel having a gas inlet at its upper end and communicating at its lower end with a middle vessel disposed around the inner vessel and spaced from the inner vessel to define therewith a chamber for the washing liquid, the inner vessel providing below the gas inlet an antechamber for containing within the washing bottle washing liquid which may, in operation of the washing bottle be sucked from the washing liquid chamber into the inner vessel, and the middle vessel having at its upper end an outlet for treated gas communicating with an outer vessel disposed around the middle vessel and spaced from the middle vessel to define therewith an overflow chamber for containing within the washing bottle washing liquid which may, in operation of the washing bottle, be forced from the washing liquid chamber, the outer vessel having an outlet at its upper end for treated gas disposed offset from the gas outlet from the middle vessel, the gas-washing bottle further comprising a pressure equalising tube extending through the inner vessel from the middle vessel to a collecting chamber for containing within the washing bottle washing liquid which may, in operation of the washing bottle, be forced from the washing liquid chamber into the pressure equalising tube.

The gas washing bottle in accordance with this invention may be constructed so as to be highly reliable in operation whilst remaining comparatively compact and simple to use. The compactness of the bottle is enhanced by disposing the inner, middle and outer vessels concentrically with respect to one another. It will be appreciated that the success of the apparatus in preventing washing liquid from being sucked by a decrease in the gas pressure or forced by an increase in the gas pressure out of the bottle into the associated upstream and downstream apparatus will depend to a large extent on the effective volume of the ante-chamber and overflow chamber with regard to the volume of washing liquid which the bottle is designed to contain. In this connection we have found it advantageous to the compactness of the bottle as a whole to provide an ante-chamber of desired volume by forming the inner vessel with an upper length not enclosed by the middle vessel which is of larger cross-sectional area than the length enclosed within the middle vessel. This upper length is preferably spherical or cylindrical in shape.

In order to prevent washing liquid which may be forced into the collecting chamber from splashing out of the collecting chamber and thereby endangering the surroundings or communicating apparatus, the collecting chamber may be arranged to communicate with the pressure equalising atmosphere, which may be the atmosphere, an inert gas atmosphere or the like, via a labyrinth-type anti-splash device. Preferably the labyrinth-like member comprises a tube projecting concentrically down into the collecting chamber and an enclosure member encloses this tube and is spaced from it, and the tube is open at the bottom to the enclosure member, which is open at the top to the collecting chamber, and has a preferably siphon-like runback leading from the bottom of it into the collecting chamber. This expedient prevents spraying or splashing even when excess pressure arises spontaneously or when the gas and liquid speeds are high, and the pressure equalising tube need not form a dog leg where it projects into the collecting vessel. The tube can easily open flush into the lowest point of the collecting chamber, so that all washing liquid forced into the collecting chamber always runs out again.

Other expedients which may be adopted to ensure that no washing liquid can be forced or sucked out of the washing bottle will be described in connection with the accompanying drawings which illustrate three embodiments of the invention and in which:

FIGURE 1 is an axial section of one embodiment;
FIGURE 2 is an axial section of a second embodiment; and
FIGURE 3 shows on a larger scale a counter-pressure or safety valve which may be employed with the embodiments illustrated in FIGURES 1 and 2.

The gas washing bottles shown in FIGURES 1 and 2 have three concentrically disposed vessels 1, 2 and 11 respectively. The first, inner, vessel 1, projects beyond the middle vessel 2 and defines with the middle vessel a chamber for the washing liquid 5, which, in operation, is placed in the bottom of the middle vessel. At the upper end of the inner vessel 1 there is an inlet 3 for the gas to be treated and at the lower end of the inner vessel there are apertures 4 for passing the gas to be treated from the inner vessel 1 into the washing liquid 5 contained in the middle vessel 2. The inner vessel 1 forms an antechamber for containing within the washing bottle washing liquid which may be sucked from the middle vessel upon a reduction in the gas supply pressure or flow rate thereof and for this purpose is provided with a spherical portion 6 of comparatively large cross-sectional area over that length which is not enclosed within the middle vessel 2. The third, outer, vessel 11 encloses the middle vessel 2 with which it communicates through at least one aperture 10 in the upper end of the wall 8 of the middle vessel 2. The outer vessel defines with the middle vessel an overflow chamber for containing within the washing bottle any washing liquid which is forced by an increase in gas pressure or gas flow rate through the aperture or apertures 10. The wall 7 of the outer vessel 11 is provided at its upper end with an outlet 9 for extraction of treated gas. The aperture or apertures 10 and the gas outlet 9 are disposed at approximately the same level but are offset relatively to each other and preferably diametrically opposite each other.

The wall 7 of the outer vessel 11 may have a sealable outlet (not shown) at the bottom for removing liquid which may be forced into this vessel.

A pressure equalising tube 12 which is open at the bottom and is arranged concentrically in the innermost vessel 1 leads from just above the floor of the middle vessel 2 up into a collecting chamber 13, which communicates with the outside air or is supplied with a pressure-equalising gas, more particularly inert gas or the same gas as the gas being washed. This communication takes place by way of a labyrinth-type anti-spray member 14 formed by a tube 15 projecting concentrically down into the collecting chamber and by an enclosure member or vessel 16 enclosing this tube at some distance from it. The tube 15 is open at the bottom to the vessel 16, and the vessel 16 is open at the top to the collecting chamber 13. As the drawings show, the bottom edge of the tube 15 is shaped like a crown, the projecting parts 17 of this edge being attached, e.g. by fusion in the case of a glass construction, to the floor of the vessel 16. Between these points of attachment there are flow passages 18. The vessel 16 is similarly attached to the collecting chamber walls at its top edge and has flow passages 19 just below this edge. A siphon-like runback 20 (FIG. 1) or a mushroom-like runback 29 (FIG. 2) leads from the lowest point of the vessel 16 back into the collecting chamber 13. The top end of the tube 15 of the anti-spray labyrinth 14 has a conical ground-in joint 21 or the like.

The effective volume of the ante-chamber formed by the innermost vessel 1 and/or the effective volume of the collecting chamber 13 are each preferably arranged to be at least double the volume of washing liquid 5 to be contained in the middle vessel 2. When in use the middle vessel contains washing liquid to a level which is about 0.2 to a maximum of 0.25 of the overall internal height of the vessel. Preferably the ratios of the internal diameters of the innermost and middle vessels are about 1:3 to 1:1.5, more particularly 1:2. The diameter and the height of the middle vessel are in a ratio of about 1:5 to 1:15 to one another.

In the embodiment shown in FIG. 2, the middle vessel 2 has a narrower cross-section for about 0.25 to 0.8, preferably 0.5 to 0.75 of its internal height. In the drawing this constriction is provided by drawing the wall 8 of this vessel inwards by way of a perpendicular, acute-angled or undercut step at this level. In the cylindrical gap 23 formed by the constriction, bubbles are crushed and broken up so that if the washing liquid 5 is of the foaming type foam or washing liquid does not pass through the aperture 10 into the outermost vessel 11. This effect can be increased by roughening the surface of at least one inside wall of the constricted region 23. The bubbles are squashed onto the rough surface and there broken up and destroyed. The best way to provide glass washing bottles with these rough surfaces is by coarse sand blasting or by sintering on a coating of fine, sharp glass splinters.

The dimensions of the constriction 23 in the middle bottle 2 and of the other narrow portions of the bottle (3, 10, 9, 24) are of course such as to prevent obstructions from occurring at these points and reducing the optimum flow capacity. It has been found that the gap 23 should be one and a half to two times greater in cross-section than for example the outlet 9, because part of the gap cross-section is occupied by the washing liquid which flows back along the walls.

In the arrangement shown in FIGURE 2, the vessel cross-section is narrowed by an annular shoulder 24 which projects inwards like a flange just below the aperture 10 at the top of the wall 8 of the middle vessel 2. This annular shoulder also helps to prevent washing liquid from penetrating into the outer vessel 11. The underside of the annular shoulder is preferably approximately perpendicular to the wall of the vessel; the top face of it may be arranged obliquely.

The aperture 10 at the top of the middle vessel may be replaced by a number of smaller apertures, all lying in one or more horizontal planes i.e. to form one or more horizontal bands of holes. However, these apertures are restricted to a relatively short portion (at most half) of the vessel circumference substantially diametrically opposite the outlet 9 in the outermost vessel 11. The aperture 10 or the smaller apertures replacing it may alternatively be arranged in the top face of the annular shoulder 24. All these features serve to effectively prevent washing liquid from passing into the outermost vessel 11 and the outlet 9 under optimum flow conditions.

In FIG. 1 a tube 22 which may be filled with a drying agent is attached to the joint 21 of the anti-spray labyrinth 14. This tube 22 may be replaced by a counter-pressure valve which is weight-loaded or the like, so that the counter-pressure is then independent of the overall height which can therefore be reduced.

FIG. 3 shows the top of a gas washing bottle constructed according to the invention and having a "bursting plate valve" attached to the joint 21. This valve comprises two chambers 27, 28 filled with glass wool or the like. The opposite edges of the two chambers are formed by flanges 33, 34 of which the flat-ground end faces bear on each other by way of a packing ring 31, a bursting plate 26 and a sharp-edged ring 32 made of hard material, e.g. stainless steel. The two flanges are enclosed in a sleeve 35 which bears on the rear shoulder of the upper flange 34 and is concentrically fixed and pressed downwards by means of a clamping device 37 attached to the top edge of the gas washing bottle.

The lower chamber 27 in the bursting plate valve contains a connection 36 communicating either with the reservoir for the gas being washed, preferably by way of a T-member with the inlet 3, or with an inert gas source at least approximately the same pressure. By this means a static counter-pressure is made to occur in the pressure equalising tube 12, balancing the pressure in the vessel 1 or 2 (FIGS. 1, 2).

The upper chamber 28 in the bursting plate valve communicates with atmosphere by way of a member, e.g. a piece of capillary tubing 30, providing pressure restriction.

The bursting plate 26 is designed so that it breaks at a certain excess pressure on one side (from below). The inner edge of the bottom face of the sharp-edged ring 32 defines the intended fracture point. A glass plate having a thickness of 0.1 mm. and a free area of 10 cm.$^2$ (equal to the cross-section of the ring 32) is used for an excess pressure of 6 to 8 metres water column.

When the glass plate 26 breaks, the glass wool or the like in the two chambers 27, 28 catches the splinters. The restriction cross-section of the capillary tubing 30 is such that the pressure wave is levelled off, ensuring that no washing liquid will spray out. This pressure restriction tube 30 may be constructed as an alarm whistle or be connected with any other gas-release or excess-pressure indicator.

The normal directions of gas flow through the gas washing bottle are indicated in the drawings by arrows. The anti-spray labyrinth 14 prevents gas-washing liquid, e.g. concentrated sulphuric acid, from being forced out of the gas washing bottle, i.e. the collecting chamber 13, even if excess pressure occurs spontaneously. This is a very great advantage compared with known gas washing bottles, particularly as far as safe operation is concerned. Further any washing liquid forced by a sudden increase in pressure through the gas outlet 10 will be trapped within the outer vessel 11.

If a negative pressure occurs in the gas cylinder or in the gas feed 3, the gas washing liquid cannot be sucked out of the gas washing bottle because of the large total effective volume of the anti-chamber formed by the inner vessel. The washing liquid therefore cannot enter the gas feed or the gas cylinder or come into contact with the connecting hoses. If necessary air can be prevented from entering in the event of a negative pressure by filling the anti-spray labyrinth 14 in the built-in collecting chamber 13 for the pressure equalising tube 12 with inert gas. As soon as the pressure difference has been compensated by way of the pressure equalising tube, the gas washing liquid in the pressure equalising tube all flows back from the piston-shaped collecting chamber into the gas washing chamber defined by the inner and middle vessels.

The safety gas washing bottle constructed according to the invention can of course be made and used in various sizes. The most convenient size for general use is a model having an external diameter of about 65 mm. and a overall height of about 600 mm. The bottle is preferably made from glass about 2–3 mm. thick, but may be made of steel or other materials.

What is claimed is:

1. A gas washing bottle comprising, in combination, a first vessel having an upper end and a lower end; gas inlet means at said upper end of said first vessel; a second vessel disposed around said first vessel and having an upper end and a lower end; a first space between said first vessel and said second vessel defining a first chamber for holding washing liquid; first aperture means at said lower end of said first vessel communicating said first vessel with said first chamber; a third vessel disposed around said second vessel and having a lower end and an upper end; a second space between said second vessel and said third vessel defining a second chamber; second aperture means at said upper end of said second vessel communicating said first chamber with said second chamber; gas outlet means for treated gas at said upper end of said third vessel; said gas outlet means being offset from said second aperature means; said second chamber being adapted to retain in the washing bottle washing liquid forced from said first chamber into said second chamber and said first vessel being adapted to retain in the washing bottle washing liquid sucked from said first chamber into said first vessel; a pressure equalising tube extending through said first vessel from said lower end of said second vessel; and a collecting chamber communicating with said pressure equalising tube; said collecting chamber being adapted to retain in the washing bottle washing liquid forced from said first chamber into said pressure equalising tube.

2. A gas washing bottle comprising, in combination, a first vessel having an upper portion and a lower portion; an ante-chamber formed in said upper portion of said first vessel, said ante-chamber having a larger cross-sectional area than said lower portion of said first vessel; gas inlet means in said upper portion, said gas inlet means being disposed above said ante-chamber; a second vessel disposed concentrically around said lower portion of said first vessel and having an upper end and a lower end; a first space between said lower portion of said first vessel and said second vessel, said first space defining a first chamber for holding washing liquid; first aperture means in said lower portion of said first vessel communicating said first vessel with said first chamber; a third vessel disposed concentrically around said second vessel and having a lower end and an upper end; a second space between said second vessel and said third vessel defining a second chamber; second aperture means at said upper end of said second vessel communicating said first chamber with said second chamber; gas outlet means for treated gas at said upper end of said third vessel; said gas outlet means being offset from said second aperture means; said second chamber being adapted to retain in the washing bottle washing liquid forced from said first chamber into said second chamber, and said ante-chamber being adapted to retain in the washing bottle washing liquid sucked from said first chamber into said first vessel; a pressure equalising tube extending co-axially through said first vessel from said lower end of said second vessel; and a collecting chamber communicating with said pressure equalising tube; said collecting chamber being adapted to retain in the washing bottle washing liquid forced from said first chamber into said pressure equalising tube.

3. A gas washing bottle as claimed in claim 2 wherein said ante-chamber is generally spherical in shape.

4. A gas washing bottle as claimed in claim 2 wherein said first space between said first vessel and said second vessel has a narrower cross-section along a middle region of its internal height.

5. A gas washing bottle as claimed in claim 4 wherein at least one inside wall of said narrower cross-section region of the first space is roughened.

6. A gas washing bottle comprising in combination, a first vessel having an upper portion and a lower portion; an ante-chamber formed in said upper portion of said first vessel, said ante-chamber having a larger cross-sectional area than said lower portion of said first vessel; gas inlet means in said upper portion, said gas inlet means being disposed above said ante-chamber; a second vessel disposed concentrically around said lower portion of said first vessel and having an upper end and a lower end; a first space between said lower portion of said first vessel and said second vessel; said first space defining a first chamber for holding a predetermined volume of washing liquid; first aperture means in said lower portion of said first vessel communicating said first vessel with said first chamber; a third vessel disposed concentrically around said second vessel and having a lower end and an upper end; a second space between said second vessel and said third vessel defining a second chamber; second aperture means at said upper end of said second vessel communicating said first chamber with said second chamber; gas outlet means for treated gas at said upper end of said third vessel; said gas outlet means being offset from said second aperture means; said second chamber being adapted to retain in the washing bottle washing liquid forced from said first chamber into said second chamber, and said ante-chamber being adapted to retain in the washing bottle washing liquid sucked from said first chamber into said first vessel; a pressure equalising tube extending co-axially through said first vessel from said lower end of said second vessel; and a collecting chamber communicating with said pressure equalising tube; said collecting chamber being adapted to retain in the washing bottle washing liquid forced from said first chamber into said pressure equalising tube; the total volume of said ante-chamber and said collecting chamber being at least twice said predetermined volume; said predetermined volume occupying from 0.2 to 0.25 of the height of said first chamber; the ratio of the diameter of said lower portion of said first vessel to the diameter of said second vessel being selected from the range from about 1:3 to about 1:1.15; and the ratio of the diameter of said second vessel to the height of said second vessel being selected from the range from about 1:5 to 1:15.

7. A gas washing bottle comprising in combination, a first vessel having an upper portion and a lower portion; an ante-chamber formed in said upper portion of said first vessel, said ante-chamber having a larger cross-sectional area than said lower portion of said first vessel; gas inlet means in said upper portion, said gas inlet means being disposed above said ante-chamber; a second vessel disposed concentrically around said lower portion of said first vessel and having an upper end and a lower end; a first space between said lower portion of said first vessel and said second vessel, said first space defining a first chamber for holding washing liquid; first aperture means in said lower portion of said first vessel communicating said first vessel with said first chamber; a third vessel disposed concentrically around said second vessel and having a lower end and an upper end; a second space between said second vessel and said third vessel defining a second chamber; second aperture means at said upper end of said second vessel communicating said first chamber with said second chamber; an inwardly projecting anular shoulder provided along the inner circumference of said second vessel below and adjacent to said second aperture means; said inwardly projecting annular shoulder sloping obliquely relatively to said second vessel and said second aperture means comprising a plurality of openings disposed in a ring around said second vessel; gas outlet means for treated gas at said upper end of said third vessel; said gas outlet means being offset from said second aperture means; said second chamber being adapted to retain in the washing bottle washing liquid forced from said first chamber into said second chamber, and said ante-chamber being adapted to retain in the washing bottle washing liquid sucked from said first chamber into said first vessel; a pressure equalising tube extending coaxially through said first vessel from said lower end of said second vessel; and a collecting chamber communicating with said pressure equalising tube; said collecting chamber being adapted to retain in the washing bottle washing liquid forced from said first chamber into said pressure equalising tube.

8. A gas washing bottle comprising in combination, a first vessel having an upper portion and a lower portion; an ante-chamber formed in said upper portion of said first vessel, said ante-chamber having a larger cross-sectional area than said lower portion of said first vessel; gas inlet means in said upper portion, said gas inlet means being disposed above said ante-chamber; a second vessel disposed concentrically around said lower portion of said first vessel and having an upper end and a lower end; a first space between said lower portion of said first vessel and said second vessel, said first space defining a first chamber for holding washing liquid; first aperture means in said lower portion of said first vessel communicating said first vessel with said first chamber; a third vessel disposed concentrically around said second vessel and having a lower end and an upper end; a second space between said second vessel and said third vessel defining a second chamber; second aperture means at said upper end of said second vessel communicating said first chamber with said second chamber; gas outlet means for treated gas at said upper end of said third vessel; said gas outlet means being offset from said second aperture means; said second chamber being adapted to retain in the washing bottle washing liquid forced from said first chamber into said second chamber, and said ante-chamber being adapted to retain in the washing bottle washing liquid sucked from said first chamber into said first vessel; a pressure equalising tube extending co-axially through said first vessel from said lower end of said second vessel; and a collecting chamber communicating with said pressure equalising tube; a labyrinth-type member communicating said collecting chamber with a pressure equalising atmosphere, said labyrinth-type member comprising an open tube projecting concentrically into said collecting chamber, an enclosure member enclosing said tube, a third space between said enclosure member and said tube, and means at the upper end of said third space communicating said third space with said collecting chamber.

9. A gas washing bottle as claimed in claim 8 including a siphon-like runback leading from the lower end of said enclosure into said collecting chamber.

10. A gas washing bottle as claimed in claim 8 including a counter-pressure valve connected to said labyrinth-type member, said counter-pressure valve including a bursting plate.

References Cited

UNITED STATES PATENTS

| 1,526,170 | 2/1925 | Milligan | 261—121 XR |
| 1,541,853 | 6/1925 | Rottmann | 261—121 |
| 2,356,530 | 8/1944 | Pflock | 261—112 XR |
| 3,103,471 | 9/1963 | Asami | 23—292 XR |

FOREIGN PATENTS

| 1,070,976 | 2/1954 | France. |

HARRY B. THORNTON, *Primary Examiner.*

E. H. RENNER, *Assistant Examiner.*